(12) United States Patent
Tseng

(10) Patent No.: US 9,763,309 B2
(45) Date of Patent: Sep. 12, 2017

(54) LIGHT-EMITTING MODULE

(71) Applicant: Shen-Ko Tseng, Taipei (TW)

(72) Inventor: Shen-Ko Tseng, Taipei (TW)

( * ) Notice: Subject to any disclaimer, the term of this patent is extended or adjusted under 35 U.S.C. 154(b) by 0 days.

(21) Appl. No.: 15/189,102

(22) Filed: Jun. 22, 2016

(65) Prior Publication Data

US 2016/0381764 A1    Dec. 29, 2016

(30) Foreign Application Priority Data

Jun. 25, 2015  (CN) .................... 2015 2 0442127 U

(51) Int. Cl.
| | |
|---|---|
| *H05B 37/02* | (2006.01) |
| *H05B 33/08* | (2006.01) |
| *F21L 4/02* | (2006.01) |
| *F21V 23/04* | (2006.01) |
| *F21Y 115/10* | (2016.01) |

(52) U.S. Cl.
CPC ............ *H05B 37/0227* (2013.01); *F21L 4/02* (2013.01); *H05B 33/0815* (2013.01); *H05B 33/0854* (2013.01); *H05B 37/0218* (2013.01); *F21V 23/0492* (2013.01); *F21Y 2115/10* (2016.08)

(58) Field of Classification Search
CPC ............ H05B 37/0227; H05B 37/0272; H05B 37/0218; H05B 33/0854; H05B 37/0281; H05B 33/0842; H05B 37/02; H05B 37/0254; H05B 33/0809; H05B 33/0815; H05B 33/0845; H05B 33/0872; H05B 37/0263

USPC ......... 315/152, 153, 297, 158, 86, 151, 291, 315/307, 294; 362/20, 234, 249.01, 362/249.02, 253

See application file for complete search history.

(56) References Cited

U.S. PATENT DOCUMENTS

| | | | | |
|---|---|---|---|---|
| 5,663,614 | A * | 9/1997 | Weng ................... | A43B 3/0005 315/323 |
| 6,858,993 | B2 * | 2/2005 | Lee ..................... | H05B 33/0803 315/185 S |
| 8,947,006 | B2 * | 2/2015 | Gou ................... | H05B 33/0857 315/200 A |
| 2007/0041193 | A1 * | 2/2007 | Wong ................... | A43B 3/0005 362/276 |
| 2011/0221353 | A1 * | 9/2011 | Tseng ................. | H05B 37/0227 315/217 |
| 2014/0139353 | A1 * | 5/2014 | Wojcieszak ............ | A43B 3/001 340/870.16 |

(Continued)

*Primary Examiner* — Douglas W Owens
*Assistant Examiner* — Wei Chan

(57) ABSTRACT

The present invention provides a light-emitting module. The light-emitting module comprises a motion actuated switch, a counter, a controller, and a plural of light-emitting devices. The motion actuated switch is for generating an actuating signal in response to a motion of an object. The counter is for recording how many times the actuating signal is generated for generating a counting signal, and determining whether the times are larger than a pre-determined threshold. The controller drives a plurality of light-emitting devices for lighting according to the actuating signal, and changes a lighting pattern according to the counting signal. Compared to the prior art, the present creation provides more kinds of lighting/shining patterns for providing eye-catching and sufficient illumination in night activities.

5 Claims, 5 Drawing Sheets

(56) References Cited

U.S. PATENT DOCUMENTS

2016/0003461 A1* 1/2016 Chen ............... F21V 33/00
362/249.02

* cited by examiner

LIGHT-EMITTING MODULE

BACKGROUND OF THE INVENTION

1. Field of the Invention

The present invention relates to a light-emitting module; more particularly, the present invention is an electrical device which controls a plurality of light-emitting devices disposed on an object to light in a sequence.

2. Description of the Prior Art

Insufficient lighting is not good for activities at night, which will easily cause some security problems or identification problems. People run or ride at night may be hit by cars due to the insufficient lighting. Additionally, if the streetlight is not bright enough, people probably cannot play ball in the court at night. Therefore, it's necessary to develop a device which may increase the security of activities at night for allowing the activities at night to be performed successfully.

Due to the security consideration mentioned above, many shoes comprising light-emitting element are presented to the public. This kind of shoes generally comprises at least one light source, such as light-emitting diode, a power source, such as a battery, and a switch, which is used to connect the battery to the light source for guiding the electrical power to the light source for lighting.

Additionally, the switch can be a simple hand-operated switch which is similar to the hand-operated switch disclosed in the U.S. Pat. No. 4,158,922. The switch also can be a mercury switch. In the mercury switch, a mercury ball can roll back and forth along with the motion of a user in a tube pillar set between a pair of electrodes. More relative descriptions of the mercury switch can be referred in the U.S. Pat. No. 4,848,009. Additionally, the switch also can be a pressure responsive switch, which can respond the weight applied by the user for turning on/off the pressure responsive switch, such as the pressure responsive switch disclosed in the U.S. Pat. No. 5,285,586. Furthermore, the switch can be a spring switch disclosed in the U.S. Pat. No. 5,408,764. The spring switch can vibrate back and forth for forming/breaking the connection with an electrode.

To prolong the life of the battery and provide more noticeable and safer display, the lighting is hoped to be controllable for lighting intermittently, and the lighting is not hoped to light continuously after the switch is switched off. If a noticeable blinking pattern can be generated by light-emitting diodes, the noticeable blinking pattern will be very interesting and noticeable.

SUMMARY OF THE INVENTION

Therefore, a scope of the present invention provides a light-emitting module; more particularly, the light-emitting module of the present invention is able to record a motion of the light-emitting module when it is applied on an external force and generate an actuating signal count for controlling a plurality of the light-emitting device to light in a pre-determined sequence.

A light-emitting module of the present invention in a better embodiment is for controlling a plurality of light-emitting device disposed on an object. The light-emitting module comprises a motion actuated switch, a counter, a controller and a battery. Wherein the motion actuated switch is for generating an actuating signal according to a motion of the light-emitting module; the counter is electrically connected to the motion actuated switch for recording a actuating signal count generated by the motion actuated switch, and the counter is electrically connected to the motion actuated switch and the counter; a plurality of light-emitting devices is electrically connected to the controller, wherein each of the light-emitting devices comprises as LED; the battery is for providing the electrical power with the actuated switch, the controller and the light-emitting device.

Wherein when the counts recorded by the counter is lower than or equal to a pre-determined threshold M, the controller drives the plurality of light-emitting devices lighting with a first pre-determined mode according to the actuating signal; if the count recorded by the counter is higher than the pre-determined threshold M, the controller drives the plurality of light-emitting devices lighting with a second pre-determined mode according to the actuating signal. The pre-determined threshold M is natural number.

The light-emitting module of the present invention in another better embodiment is for controlling a plurality of light-emitting device, comprising: a motion actuated switch, a counter and a controller. Wherein the motion actuated switch is for generating an actuating signal according to a motion of the light-emitting module; a counter is for selectively generating a counting signal according to the count of the actuating signal generated by the motion actuated switch, the counter is electrically connected to the motion actuated switch; and the controller is electrically connected to the motion actuated switch and the counter, wherein the controller drives the plurality of the light-emitting devices according to the actuating signal and the counting signal.

Compared to the prior art, the present creation provides more kinds of lighting/shining patterns for providing eye-catching and sufficient illumination in night activities.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
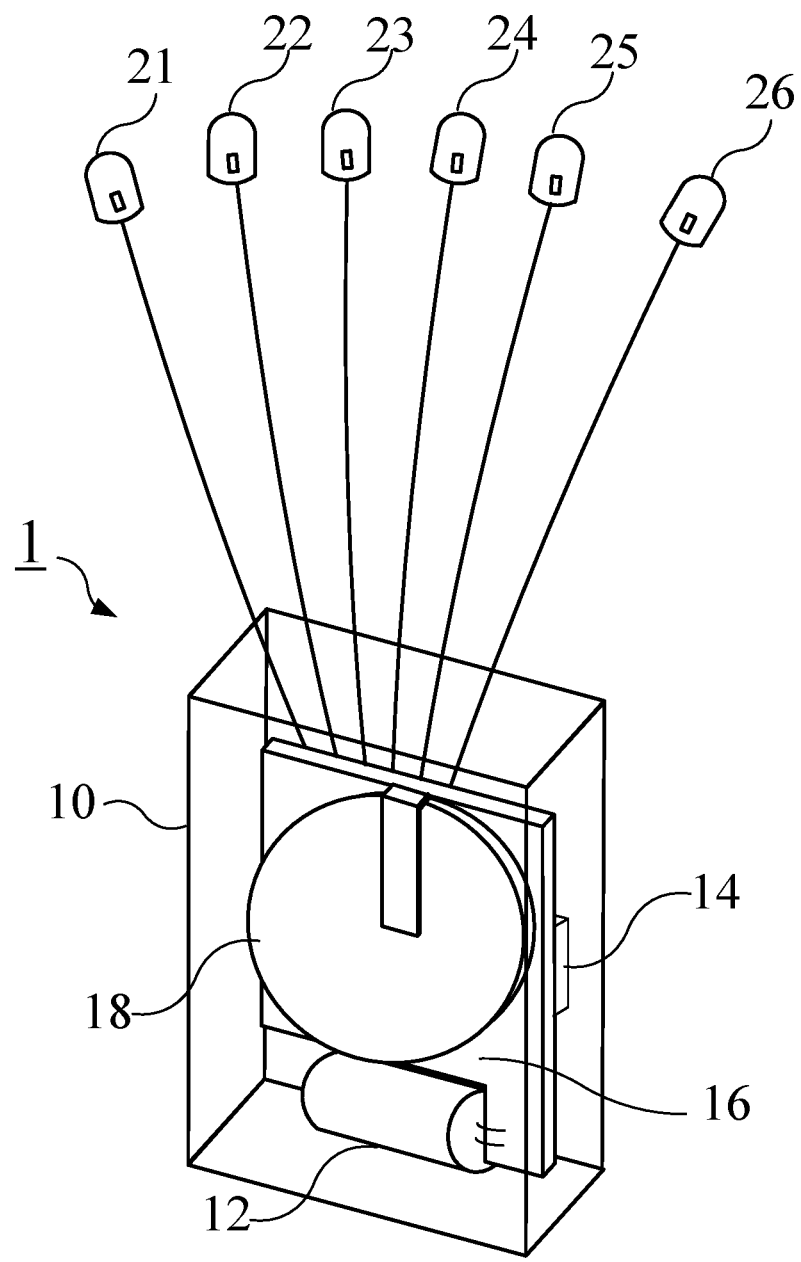
FIG. 1 shows a schematic diagram of the present invention in an embodiment.
Figure 2:
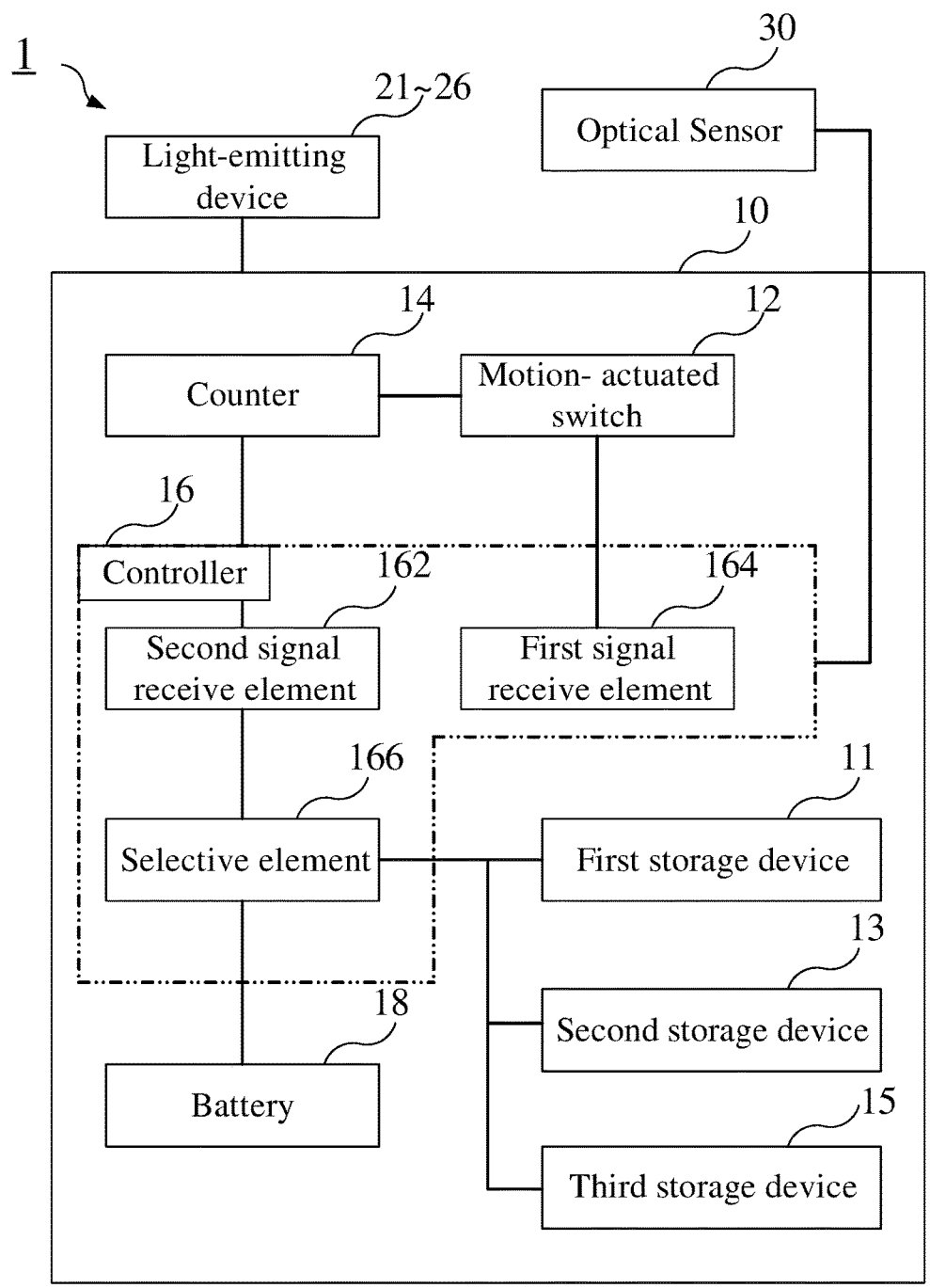
FIG. 2 shows a function block diagram of the present invention in an embodiment.

Please refer to FIG. 1 and FIG. 2. FIG. 1 shows a schematic diagram of the present invention in an embodiment. FIG. 2 shows a function block diagram of the present invention in an embodiment. A light-emitting module 1 of the present invention is used to control a plurality of the light-emitting devices 21 to 26 to light in a sequence. In FIG. 1, the light-emitting module 1 further comprises an outer shell 10, a motion actuated switch 12, a counter 14, a controller 16, a battery 18, a first storage device 11, a second storage device 13 and a third storage device 15. The outer shell 10 seals or covers the motion actuated switch 12, the counter 14 and the controller 16.

According to an embodiment of the present invention, the motion actuated switch 12 is configured in the outer shell 10 to response the motion of the object like vibration or the move, and actuates the counter 14 and the controller 16. In another word, when the object vibrates or moves, the motion actuated switch 12 generates an actuating signal and transmits the actuating signal to the controller 16, and the counter 14 records the number or count of the actuating signal generated by the motion actuated switch 12. Besides, the counter 14 and the controller 16 are also configured in the outer shell 10 and electrically connected to the motion actuated switch 12.

If the count recorded by the counter 14 is higher than a pre-determined threshold M, the counter 14 generates a counting signal to the controller 16 which then drives the plurality of light-emitting devices 21 to 26 to flash based on a second pre-determined mode according to the actuating signal and the counting signal. If the count recorded by the counter 14 is lower than or equal to the pre-determined threshold M, the counter 14 does not generate the counting signal, and the controller 16 drives the plurality of light-emitting devices 21 to 26 to flash based on a first pre-determined mode according to the actuating signal.

The light-emitting module 1 further comprises the first storage device 11, the second storage device 13 and the third storage device 15 which are electrically connected to the controller 16 and store a first lighting mode, a second lighting mode and a third lighting mode respectively. The controller 16 further comprises a first signal receive element 164, a second signal receive element 162 and a selective element 166. The first signal receive element 164 is electrically connected to the motion-actuated switch 12 to receive the actuating signal. The second signal receive element 164 is electrically connected to the counter 14 to receive the counting signal. The selective element 166 is electrically connected to the first storage device 11, the second storage device 13 and the third storage device 15.

When the second signal receive element 162 does not receive the counting signal, the selective element 166 chooses one of the first lighting mode, the second lighting mode and the third lighting mode to be the first pre-determined mode. Then the controller 16 drives the plurality of the light-emitting elements 21 to 26 to flash based on the lighting mode (which is the first pre-determined mode in this embodiment) chose by the selective element 166 according to the actuating signal.

When the second signal receive element 162 receives the counting signal, the selective element 166 chooses one of the first lighting mode, the second lighting mode and the third lighting mode to be the second pre-determined mode. Then the controller 16 drives the plurality of the light-emitting elements 21 to 26 to flash based on the lighting mode (which is the second pre-determined mode in this embodiment) chose by the selective element 166 according to the actuating signal and the counting signal.

The first pre-determined mode and the second pre-determined mode are different. That is to say, if the first lighting mode is chosen to be the first pre-determined mode, the first lighting mode is unable to be chosen to be the second pre-determined mode. In other words, when the first lighting mode is the first pre-determined mode and the second signal receive element 162 receives the counting signal, the selective element 166 can only select either the second lighting mode or the third lighting mode to be the second pre-determined mode.

In an embodiment, each of the light-emitting devices 21 to 26 comprises an LED. When the LEDs shine or light, it will generate the obvious patterns or colors. The battery 18 is for providing the electrical power with the light-emitting module 1. In an embodiment, the pre-determined threshold M is a natural number, such as 10. Of course, the pre-determined threshold M is changeable according to the needs of the producer. And such pre-determined threshold M in another embodiment could be stored in the light-emitting module 1 and changed by the user later.

In another embodiment, the number or count of the actuating signal generated by the motion actuated switch 12 will be reset to 0, depending on the size of the counter 14.

Moreover, in another embodiment, the light-emitting module 1 further comprises an optical 30. The optical sensor 30 is electrically connected to the controller, and can disable the controller to drive the light-emitting devices to flash based on the first pre-determined mode or the second pre-determined mode, depending on the strength of the environmental brightness. Therefore, the present invention can save more power.

Figure 3A:
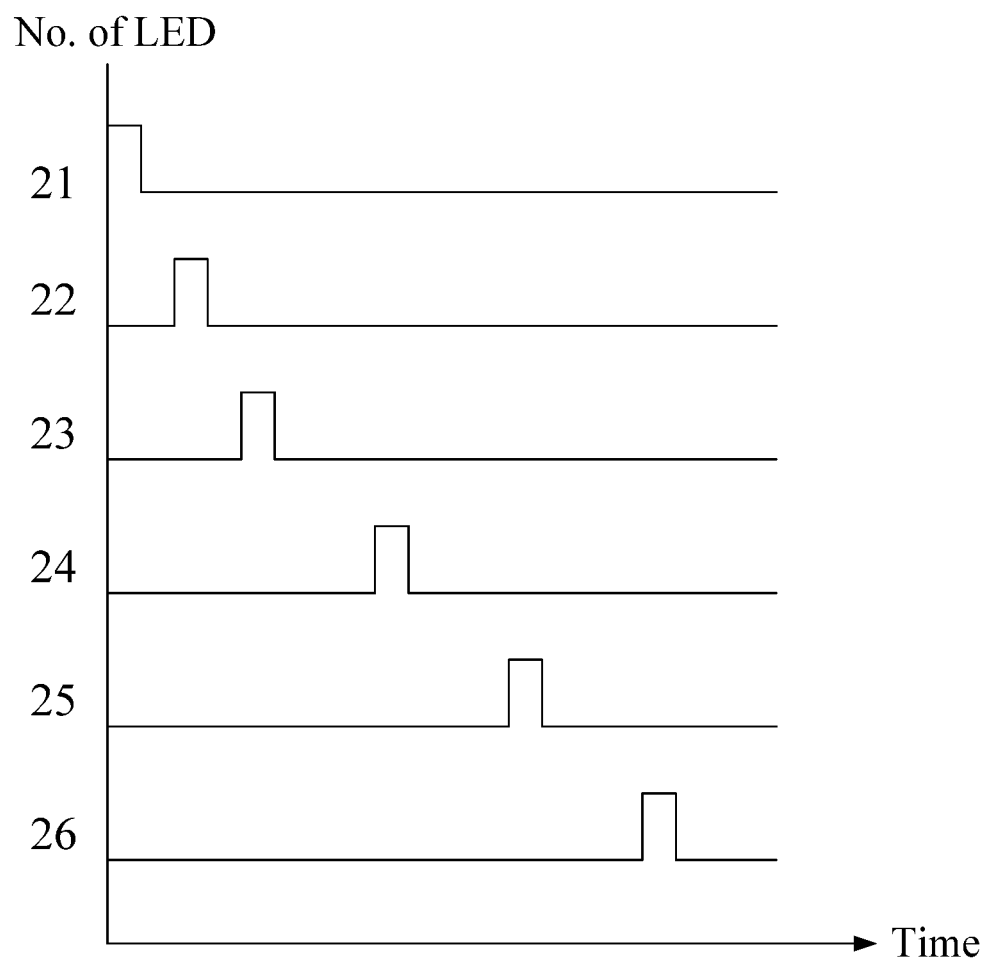
FIG. 3A shows a diagram of a first lighting mode of the present invention in an embodiment.
Figure 3B:
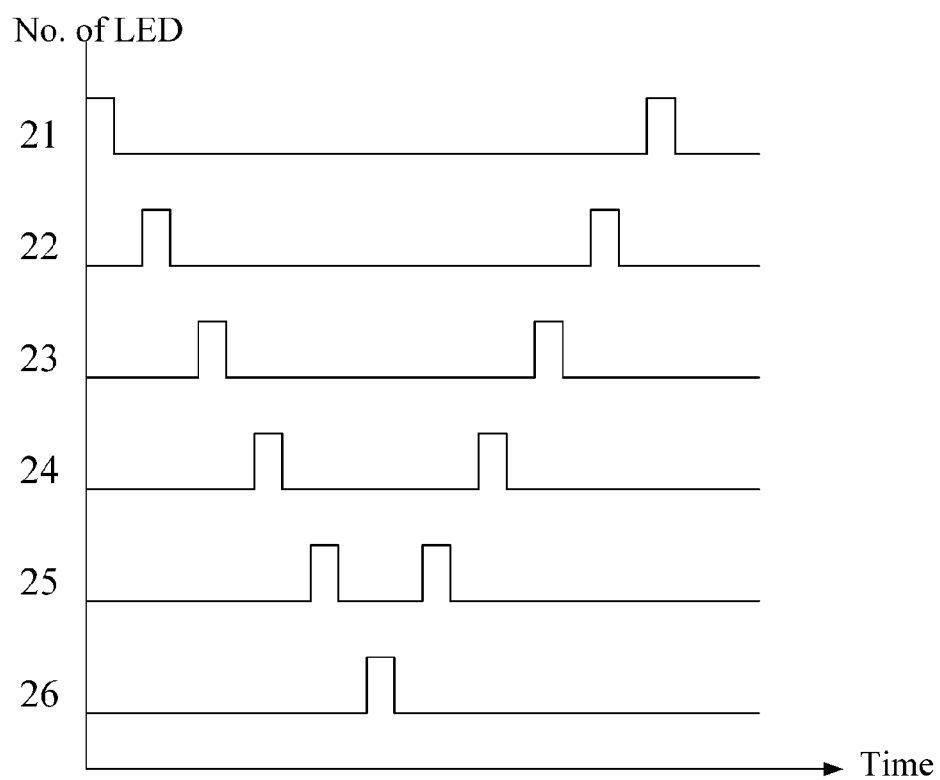
FIG. 3B shows a diagram of a second lighting mode of the present invention in an embodiment.
Figure 3C:
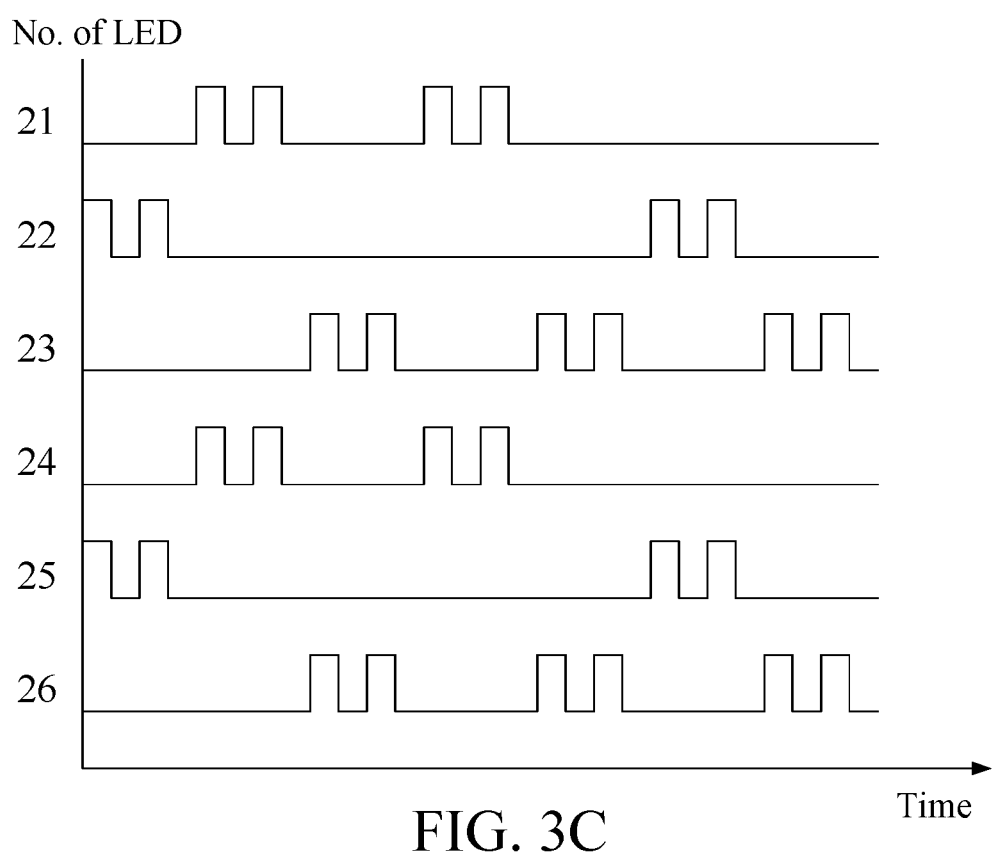
FIG. 3C shows a diagram of a third lighting mode of the present invention in an embodiment.

The statements mentioned below illustrate the lighting modes. Please refer to FIG. 3A to FIG. 3C. FIG. 3A shows an example diagram of a first lighting mode of the present invention in an embodiment. FIG. 3B shows an example diagram of a second lighting mode of the present invention in an embodiment. FIG. 3C shows an example diagram of a third lighting mode of the present invention in an embodiment. The horizontal axis and the vertical axis in FIG. 3A to FIG. 3C are relatively the time axis and the number of the LED, and each of the square waves mean that the diode flashes. FIG. 3A to FIG. 3C in this embodiment show a lighting cycle.

Please refer to FIG. 3A; in this embodiment the first lighting mode is for lighting the light-emitting devices 21 to 26 sequentially to form a lighting cycle and repeats the lighting cycle for N times, wherein the N is a natural number. Please refer to FIG. 3B, the second lighting mode is for lighting the light-emitting devices 21 to 26 sequentially and reversely to form a lighting cycle and then repeats the lighting cycle with N times, wherein the N is a natural number.

Please refer to FIG. 3C, the third lighting mode is for lighting each of the light-emitting devices 21 to 26 twice in a pre-determined sequence. For example, in FIG. 3C, the light-emitting devices 22 and 25 simultaneously light twice at first; then, the light-emitting devices 21 and 24 simultaneously light twice; finally, the light-emitting devices 23 and 26 simultaneously light twice.

According to the statements mentioned above, the present invention provides the light-emitting module, for generating the counting signal by judging if the actuating count recorded by the controller and generated when the motion actuated switch detects the motion of the external force is higher than the pre-determined threshold, the controller drives a plurality of light-emitting devices according to the actuating signal, and change the pre-determined mode of the light-emitting device according to the counting signal.

Compared to the prior art, the present creation provides more kinds of lighting/shining pattern for providing eye-catching and sufficient illumination in night activity.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light-emitting module, comprising:
   a motion actuated switch generating an actuating signal according to a motion of the light-emitting module;
   a counter selectively generating a counting signal according to a count of the actuating signal generated by the motion actuated switch, the counter electrically connected to the motion actuated switch;
   a controller electrically connected to the motion actuated switch and the counter;
   an outer shell sealing the motion actuated switch, the counter and the controller;
   a plurality of light-emitting devices driven by the controller to flash based on a lighting mode according to the actuating signal and the counting signal; and
   a battery providing electrical power with the motion actuated switch, the controller, the counter and the plurality of light-emitting devices;
   wherein the lighting mode is a first pre-determined mode when the controller only receives the actuating signal, and the lighting mode is a second pre-determined mode when the controller receives both the actuating signal and the counting signal.

2. The light-emitting module of claim 1, wherein the light-emitting module further comprises a first storage device electrically connected to the controller, the first storage device stores a first lighting mode, and the first lighting mode is for the light-emitting devices to light sequentially to form a lighting cycle and repeating the lighting cycle with N times.

3. The light-emitting module of claim 1, wherein the light-emitting module further comprises a second storage device electrically connected to the controller, the second storage device stores a second lighting mode, and the second lighting mode is for lighting the light-emitting devices sequentially and reversely to form a lighting cycle and repeating the lighting cycle with N times.

4. The light-emitting module of claim 1, wherein the light-emitting module further comprises a third storage device electrically connected to the controller, the third storage device stores a third lighting mode, and third lighting mode is for lighting each of the light-emitting devices twice in a pre-determined sequence.

5. The light-emitting module of claim 1, wherein each of light-emitting devices comprises an LED.

\* \* \* \* \*